United States Patent
Sun et al.

(10) Patent No.: US 9,180,775 B2
(45) Date of Patent: Nov. 10, 2015

(54) MOLDING METHOD OF BLOW-MOLDING HOLLOW TANK BODY WITH BUILT-IN COMPONENT AND PRE-MOLDING TEMPLATE DEVICE

(75) Inventors: Yan Sun, Yangzhou (CN); Lin Jiang, Yangzhou (CN); Liang Liu, Yangzhou (CN); Songjun Xu, Yangzhou (CN); Yihu Liu, Yangzhou (CN); Dejun Gao, Yangzhou (CN); Weidong Su, Yangzhou (CN); Dengqun Li, Yangzhou (CN); Yan Yang, Yangzhou (CN); Wenbin Hong, Yangzhou (CN); Ye Wang, Yangzhou (CN)

(73) Assignee: YAPP AUTOMOTIVE PARTS CO., LTD., Yangzhou, Jiangsu Province (CN)

( * ) Notice: Subject to any disclaimer, the term of this patent is extended or adjusted under 35 U.S.C. 154(b) by 744 days.

(21) Appl. No.: 13/389,754

(22) PCT Filed: Oct. 26, 2009

(86) PCT No.: PCT/CN2009/001188
§ 371 (c)(1),
(2), (4) Date: Feb. 9, 2012

(87) PCT Pub. No.: WO2011/020223
PCT Pub. Date: Feb. 24, 2011

(65) Prior Publication Data
US 2012/0139168 A1    Jun. 7, 2012

(30) Foreign Application Priority Data
Aug. 19, 2009 (CN) .......................... 2009 1 0184707

(51) Int. Cl.
| B29C 43/02 | (2006.01) |
| B60K 15/03 | (2006.01) |
| B29C 51/26 | (2006.01) |
| B29C 51/30 | (2006.01) |

(Continued)

(52) U.S. Cl.
CPC .......... B60K 15/03177 (2013.01); B29C 51/262 (2013.01); B29C 51/267 (2013.01); B29C 51/30 (2013.01); B29C 47/0023 (2013.01);
(Continued)

(58) Field of Classification Search
CPC .............................. B29C 51/10; B29C 51/267
USPC ................................................... 264/515, 250
See application file for complete search history.

(56) References Cited

U.S. PATENT DOCUMENTS

| 2008/0078761 A1* | 4/2008 | Borchert et al. ............. 220/4.13 |
| 2009/0162472 A1 | 6/2009 | Aoki et al. |

FOREIGN PATENT DOCUMENTS

| CN | 2882972 Y | 3/2007 |
| CN | 101015953 A | 8/2007 |

(Continued)

*Primary Examiner* — Galen Hauth
(74) *Attorney, Agent, or Firm* — PROI Intellectual Property US (57) ABSTRACT

A molding method of blow-molding a hollow tank body with a built-in component is provided. The method molds the hollow tank body by molding the sheet parisons in the half molds. After the moving cooperation of the half molds, an expanding mechanism of a pre-molding template device, the template half plates and the bases, the half molds are respectively leaned against the closed template half plates, and the sheet parisons are leaned against the half molds by blowing and/or sucking so as to be pre-molded. The tank body is molded after placing the component into it. A pre-molding template device is also provided. An expanding mechanism and the template half plates are mounted on the bases, and the bases are mounted on a rail bracket, the bases are driven by a power device to move on the rail bracket.

4 Claims, 6 Drawing Sheets

(51) Int. Cl.
  *B29C 51/10* (2006.01)
  *B29C 51/12* (2006.01)
  *B29L 31/00* (2006.01)
  *B29C 47/00* (2006.01)
  *B29C 51/38* (2006.01)

(52) U.S. Cl.
  CPC ......... *B29C47/0054* (2013.01); *B29C 47/0066* (2013.01); *B29C 51/10* (2013.01); *B29C 51/12* (2013.01); *B29C 51/261* (2013.01); *B29C 51/38* (2013.01); *B29C 2791/006* (2013.01); *B29C 2791/007* (2013.01); *B29C 2793/0063* (2013.01); *B29L 2031/7172* (2013.01); *B60K 2015/03032* (2013.01); *B60K 2015/03453* (2013.01)

(56) References Cited

FOREIGN PATENT DOCUMENTS

CN   101466525 A   6/2009
CN   101489759 A   7/2009

* cited by examiner

MOLDING METHOD OF BLOW-MOLDING HOLLOW TANK BODY WITH BUILT-IN COMPONENT AND PRE-MOLDING TEMPLATE DEVICE

FIELD OF THE INVENTION

The present invention relates to a molding method of blow-molding a hollow tank body, and more particularly, to a molding method of blow-molding a hollow tank body with a build-in component. The present invention also relates to a pre-molding template device used in the molding method.

BACKGROUND OF THE INVENTION

An automobile plastic fuel tank is widely approved by customers in the virtue of light weight, good safety performance, corrosion protection, impact resistance, long life service and greater design freedom. At present, HDPE6-layer co-extrusion blow molding technology with EVOH fuel barrier layer is a main technology for manufacturing the plastic fuel tank. As governments all over the world are enhancing awareness of environment protection, as prescribed in the relevant laws and regulations, automobile manufacturers are subjected to a strict request, for instance, California in US issued a regulation regarding Partial Zero Emission Vehicle (hereinafter referred to as PZEV), i.e. the fuel tank assembly has permeation amount less than 20 mg/24 H. For the plastic fuel tank manufactured in the present technology, the fuel tank assembly evaporative emission including leakage of the gasoline in the fuel tank body, welding face, assembly parts and seal components is generally 500 mg/24 H. So PZEV standard is extremely harsh for the plastic fuel tank. In order to get this target, there currently have such technologies in use, such as INSHELL mainly covering multilayer board by means of a welding face, integrating pipelines inside the fuel tank so as to reduce gasoline permeation amount of the welding face, which however largely increases equipment investigation cost due to a laser welding required; at the same time, including SIB and ICS, i.e. placing integrated component modules inside the tank body to reduce the gasoline permeation amount by using a method of "fuel tank being sleeved in fuel tank", which results in largely increasing cost of one piece of product; also, forming even sheet partisans by a extruding process and manufacturing by using a special mould have such problems as low production efficiency, high cost of one piece of product and high cost of equipment. Therefore, there might be an oncoming problem how to improve the production efficiency and decrease HC permeation amount in the hollow tank body when cost of manufacture equipment and products is reduced.

BRIEF SUMMARY OF THE INVENTION

The present invention intends to provide a molding method of blow-molding a hollow tank body with a build-in component and a pre-molding template device for implementing the molding method, which is more convenient and has low cost and high product yield over the prior art.

To achieve this purpose, the present invention provides a molding method of blow-molding a hollow tank body with a build-in component, in which the hollow tank body is molded by molding the sheet parisons in half molds, including the steps of feeding, pre-molding, building-in component and molding.

In a feeding step, two sheet parisons with curved surface are respectively delivered in parallel into two clearances formed by the two half molds and the pre-molding template device;

in a pre-molding step, after the moving cooperation of the half molds, an expanding mechanism of a pre-molding template device, template half plates and bases, the half molds are respectively leaned against the closed template half plates, and the sheet parisons are leaned against the half molds by blowing and/or sucking so as to be pre-molded;

in a building-in component step, after opening the half molds and removing the pre-molding template device, the build-in mechanism pre-provided with the components is pushed into the middle of the two half molds by a lifting device such that the component and the inner surface of the pre-molding parison are connected; and in a molding step, after removing the build-in mechanism by the lifting device, closing the half mold, the pre-molding parison with the component is molded to be a molding plastic hollow tank body.

The moving cooperation of the half molds and the pre-molding template device comprises the following steps:

moving and closing the two bases to close and move the template half plates respectively mounted on each of bases to the middle of the two half molds;

while moving and closing the two bases, moving the expanding mechanism mounted on the bases towards each other, and when tentacles of the expanding mechanism contact the edges of the sheet parisons with curved surface, the tentacles respectively clamp the edges of the two sheet parisons to strain the sheet parisons with the curved surface in an opposite direction;

supervising molding of the sheet parison by a pressure, temperature sensor and/or a video probe head mounted on the template half plate; and connecting the components in a manner of welding or riveting.

According to another aspect of the present invention, there is provided a pre-molding template device for implementing the molding method. The pre-molding template device provides power by using a power device, including an expanding mechanism, template half plates, bases, a rail bracket and a power device, wherein the expanding mechanism and the template half plate are mounted on the base, the bases are mounted on the rail bracket, and the bases are driven by the power device to move on the rail bracket.

The expanding mechanism comprises tentacles and a pressure cylinder, the pressure cylinder driving the tentacles to extend-retract. The two bases are respectively mounted on the rail bracket, each base provided with one template half plate and at least two tentacles and pressure cylinders.

The pressure cylinder employs a pneumatic cylinder and a hydraulic cylinder.

The expanding mechanism of the pre-molding template device levels off the sheet parisons with curved surface and uneven sheet parisons and indirectly adjusts thickness of the sheet parisons by means of the tentacles and the pressure cylinder. Closing and opening of the base are driven by a motor or the hydraulic cylinder. The components of the build-in mechanism are preassembled by workers or machines.

The advantage of the present invention is to provide an effective molding method and device which reduces equipment investment and product cost, enhances applicability to uneven sheet parisons and increases the product yield by using the pre-molding template device, and allows the build-in component to minimize the number of openings on the tank wall and to realize lower permeability of the molded hollow tank body.

Wherein, lists of designates are as follows:

| 1, 2 | template half plates; | 3, 4 | half molds; |
|---|---|---|---|
| 5 | build-in mechanism; | 6 | lifting device; |
| 7 | rail bracket; | 8, 9 | bases; |
| 10, 11, 12, 13 | pneumatic cylinders; | 14, 15, 16, 17 | tentacles; |
| 18, 19 | sheet parisons; | 20 | component; |
| 21, 22 | pre-molding parisons | | |

DETAILED DESCRIPTION OF THE EMBODIMENTS

Reference will now be made in detail to the specific embodiments of the present invention, examples of which are illustrated in the accompanying drawings.

The embodiment, as shown in FIG. 1, FIG. 2, FIG. 3, FIG. 4, FIG. 5, FIG. 6 and FIG. 7, employs a molding method of blow-molding a hollow tank body with a build-in component, applied in automobile, in which the hollow tank body is molded by blow-molding the sheet parisons 18, 19 in the half molds 3, 4, including the steps of feeding, pre-molding, building-in components and molding. The hollow tank body is an automobile hollow fuel tank. The material of the parisons is selected from thermoplastic plastics. The component 20 is a device coupling to the tank body for performing a certain function.

Figure 4:
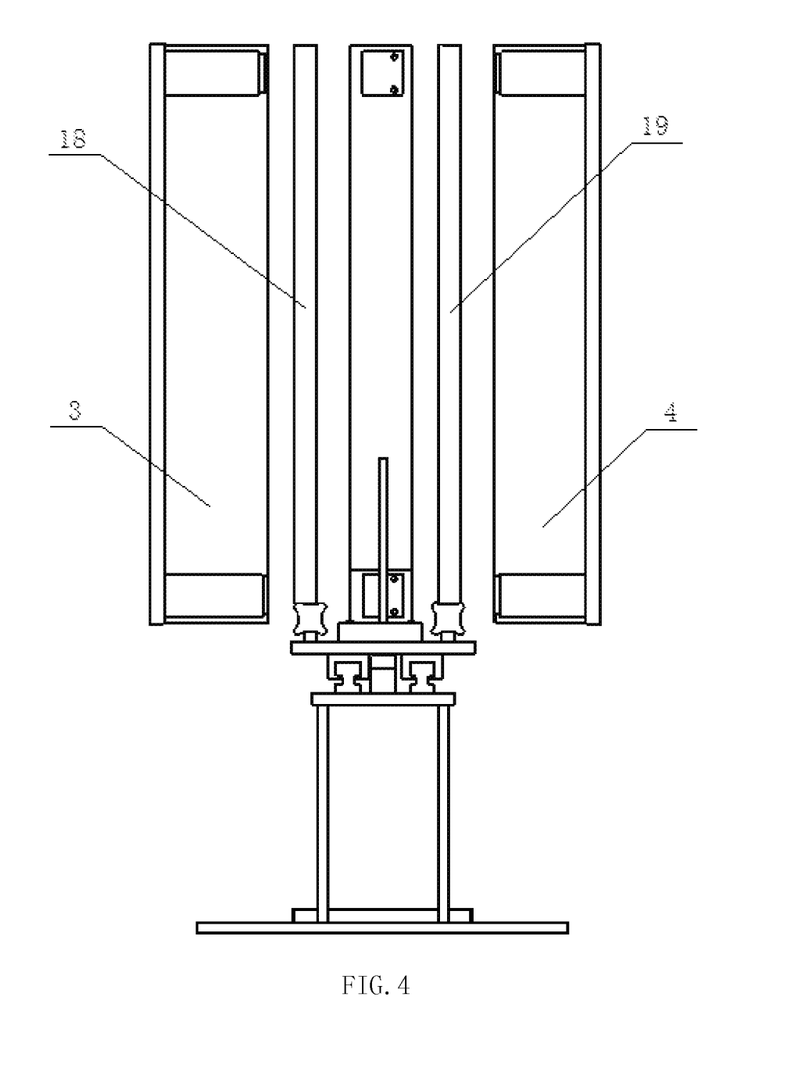
FIG. 4 is a diagram of feeding according to the embodiment of the present invention.

In a feeding step, plasticized plastic cylindrical parison extruded by an ordinary mold head is cut into two independent sheet parisons 18, 19 with curved surface through a sheet molding device. The half molds 3, 4 are separated into two regions by two template half plates 1, 2 of the pre-molding template device. The two sheet parisons 18, 19 are respectively fed into the two regions in parallel.

Figure 5:
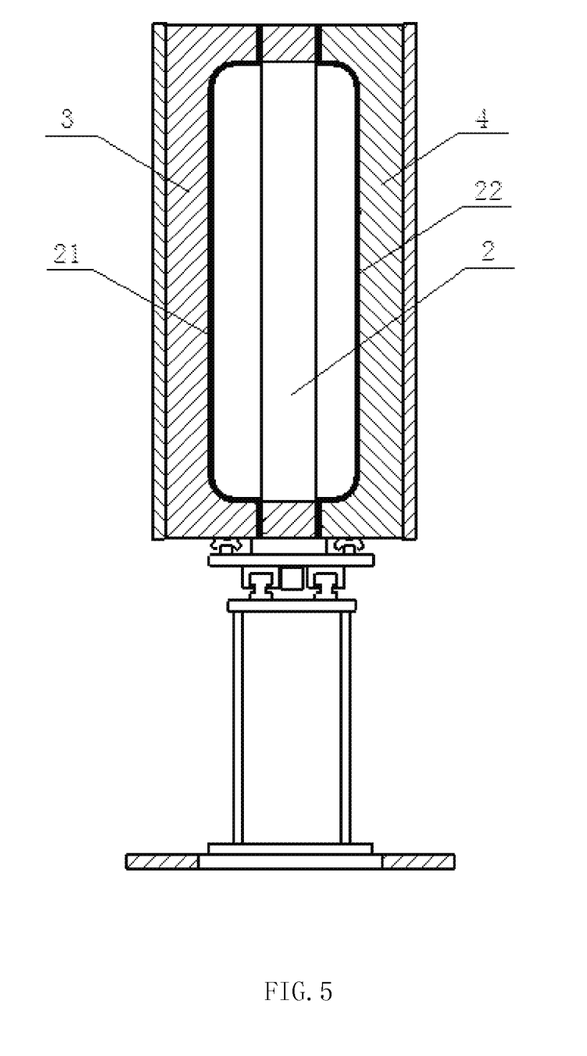
FIG. 5 is a sectional view of the pre-molding according to the embodiment of the present invention.

In a pre-molding step, by moving cooperation of the half molds 3, 4, the expanding mechanism in the pre-molding template device, the template half plates 1, 2 and the bases 8, 9, wherein the two bases 8, 9 are moved and closed, and simultaneously the template half plates 1, 2 respectively mounted on each of the bases 8, 9 are driven to close and move to the middle of the two half molds 3, 4; while moving and closing the two bases 8, 9, the expanding mechanisms mounted on the bases 8, 9 are moved towards each other; when the tentacles 14, 15, 16 and 17 of the expanding mechanism contact the edges of the sheet parisons 18, 19 with curved surface, the tentacles 10, 11, 12 and 13 respectively clamp the edges of the two sheet parisons 18, 19 to strain the sheet parisons 18, 19 with the curved surface in an opposite direction so as to level off the sheet parisons 18, 19, keep a stable shape of the parisons in the pre-molding process, and ensure successful implement of the pre-molding die step to a large extent, at the same time, to reduce fins materials and the material cost of one piece of the product. The half molds 3, 4 are respectively leaned against the closed template half plates 1, 2, by blowing via a blow needle provided on the template half plates 1, 2 and by sucking through a suction hole provided on the half molds 3, 4, such that the sheet parisons 18, 19 between the two regions are respectively pasted to the half molds 3, 4 to mold the sheet parisons to be the pre-molding parisons 21, 22 of the two half-sheet hollow fuel tank.

Figure 6:
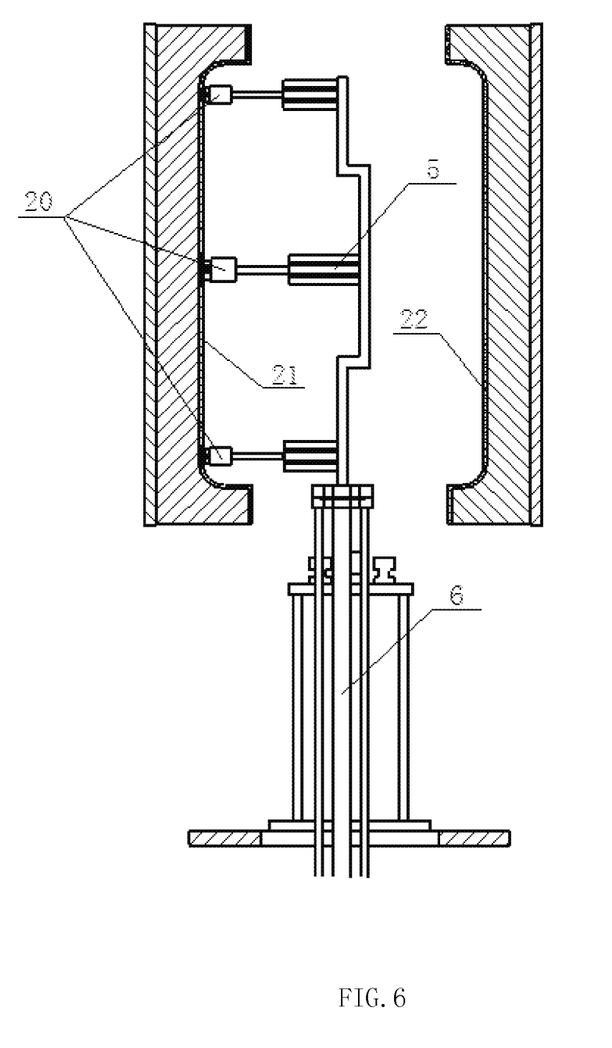
FIG. 6 is a sectional view of the build-in component according to the embodiment of the present invention.

In a building-in step, the half molds 3, 4 are opened; the two template half plates 1, 2 of the pre-molding template device are opened and removed by the bases 8, 9; the build-in mechanism 5 preassembled with the component 20 is pushed by a lifting device 6 from lower portion of the opened half molds 3, 4 into the middle of the two half molds 3, 4; the component 20 is connected with the inner surface of any one of the half-sheet hollow fuel tank pre-molding parisons 21, 22 by pressing and riveting, also connecting to the component in a welding manner, and both the two sheets are connected with the component 20.

Figure 7:
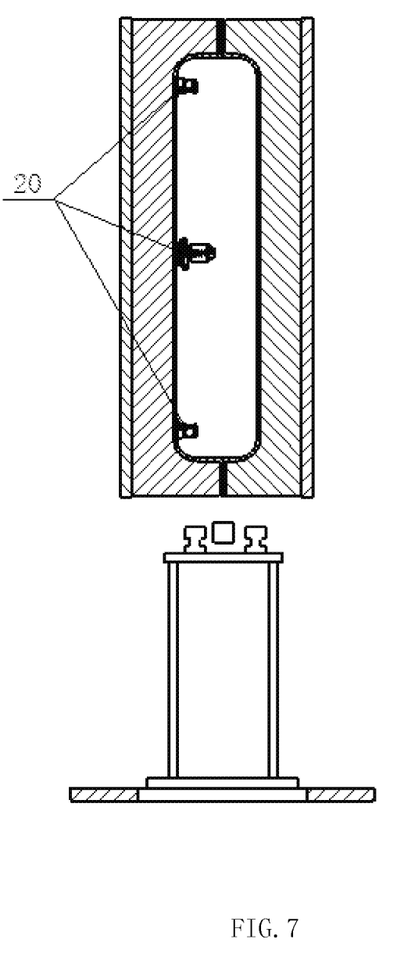
FIG. 7 is a sectional view of the molding according to the embodiment of the present invention.

In a molding step, after removing the build-in mechanism 5 by the lifting device 6, closing the half molds 3, 4, two hollow fuel tank pre-molding parisons 21, 22 with the component 20 are molded to be one molding hollow fuel tank.

In the molding and the pre-molding steps, supervising the pre-molding and molding process by a pressure, temperature sensor and a visual probe head mounted on the template half plates 1, 2.

Figure 1:
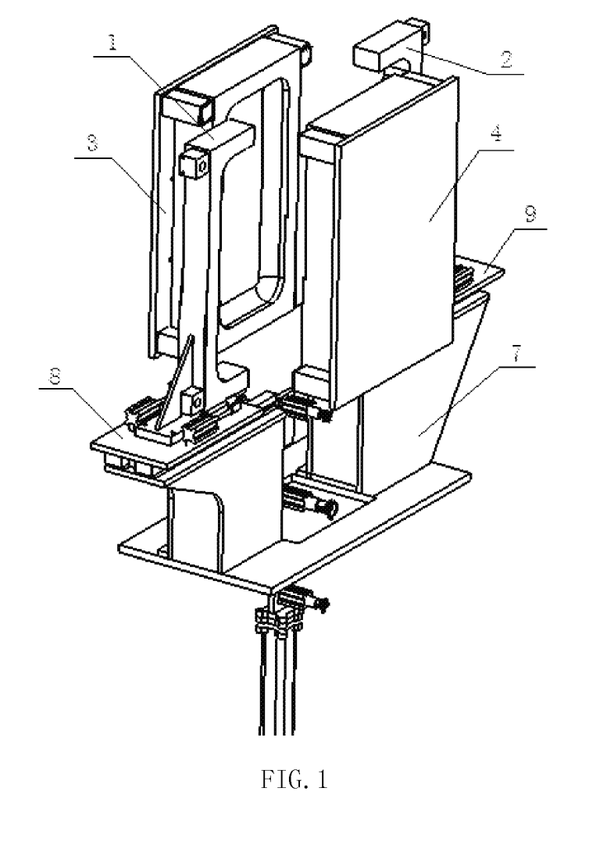
FIG. 1 is a diagram of the pre-molding template device and a three-dimensional structure including a mold template, lifting device and a build-in mechanism according to the embodiment of the present invention.
Figure 2:
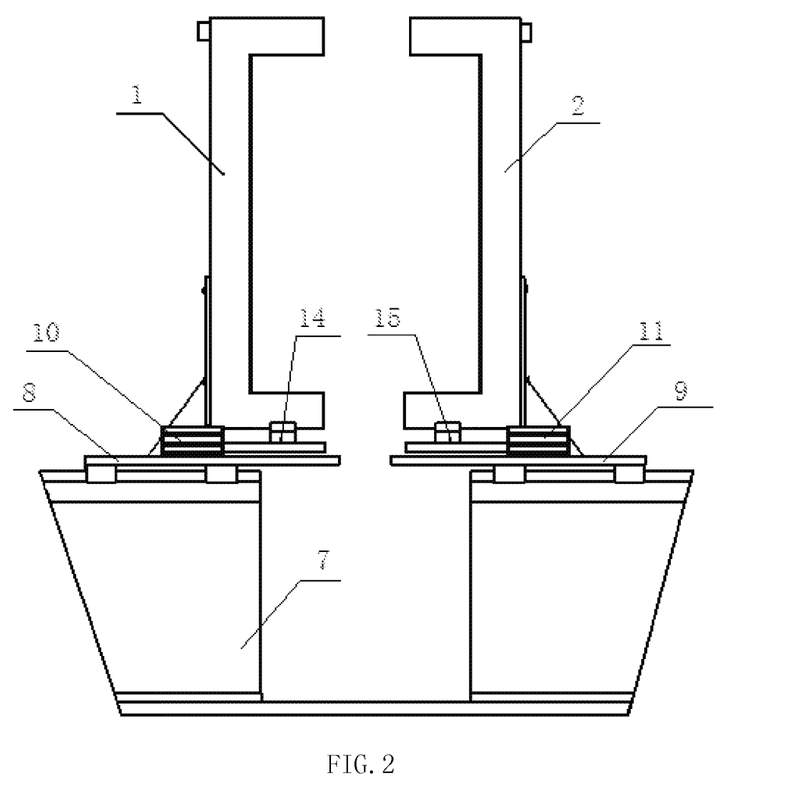
FIG. 2 is a front view of the pre-molding template device according to the embodiment of the present invention.
Figure 3:
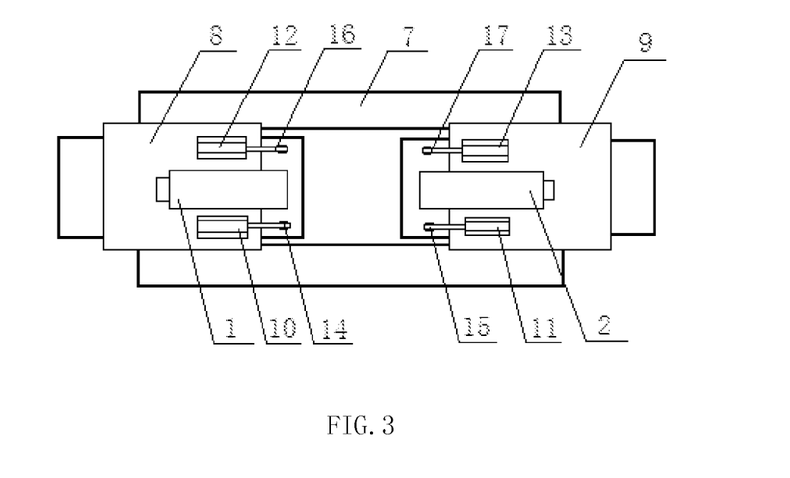
FIG. 3 is a top view of the pre-molding template device according to the embodiment of the present invention.

For carrying out the molding method of blow-molding the hollow tank body with the build-in component, in this embodiment, there is provided a pre-molding template device comprising an expanding mechanism, template half plates 1, 2, bases 8, 9, a rail bracket 7 and a power device, wherein the expanding mechanism and the template half plates 1, 2 are mounted on the bases 8, 9; the bases 8, 9 are mounted on the rail brackets; the bases 8, 9 are driven by a motor in the power device to move on the rail bracket 7; and the power device also can provide power by using the hydraulic cylinder.

The expanding mechanism comprises tentacles 14, 15, 16, 17 and pneumatic cylinders 10, 11, 12, 13, the pneumatic cylinders 10, 11, 12, 13 driving the tentacles 14, 15, 16, 17 to extend-refract and clamp. The two bases 8, 9 are respectively mounted on the rail bracket 7, each of the bases 8, 9 being provided with one template half plate 1, 2 and two tentacles 14, 15, 16, 17 and pneumatic cylinders 10, 11, 12, 13. The tentacles 14, 15, 16, 17 mounted on different bases 8, 9 and the pneumatic cylinders 10, 11, 12, 13 are correspondingly interposed to perform the function of contacting and straining the sheet parisons 18, 19. Two groups or more tentacles 14, 15, 16, 17 and the pneumatic cylinders 10, 11, 12, 13 are provided in the expanding mechanism to strain the sheet parisons 18, 19; and extend-retract of the tentacles 14, 15, 16, 17 can be achieved by a hydraulic fuel tank.

In this embodiment, the blow-molding hollow tank body with the build-in component can be molded by using the pre-molding template device. This method is simple and efficiently reduces the cost of purchasing planar sheet parison equipments and cost of one piece of the product, efficiently reduces the permeation amount of the product due to the build-in component 20 structure and efficiently increases the product yield by the expanding mechanism and a supervise equipment.

The present invention is not limited to the step of moving cooperation of the half molds 3, 4 and the pre-molding template device in the embodiments as above mentioned, and the other steps of enabling producing cooperation falls within the present invention.

What is claimed is:

1. A molding method of blow-molding a hollow tank body with at least one build-in component, in which the hollow tank body is molded by molding sheet parisons in half molds, including steps of feeding, pre-molding, building-in of component, and molding, characterized in that:

in the feeding step, delivering, in parallel, two sheet parisons with curved surface to two clearances respectively; wherein the two clearances are formed by two half molds and a pre-molding template device arranged there-between; wherein the pre-molding template device comprises two template half plates;

in the pre-molding step, by coordinated movement of the two half molds and the pre-molding template device, bringing the two half molds into contact with the two template half plates respectively and bringing the two sheet parisons into contact with the two half molds by blow action and/or suck action so as to form the two sheet parisons into two pre-molding parisons;

in the building-in of component step, moving the two half molds away from each other, removing the pre-molding template device, placing a build-in mechanism pre-loaded with a component into the middle of the two half molds using a lifting device, and connecting the component with at least one of the two pre-molding parisons;

in the molding step, removing the build-in mechanism using the lifting device, moving the two half molds towards each other, and molding the two pre-molding parisons with the component into a plastic hollow tank body;

wherein the pre-molding template device further comprises two base plates for supporting the two template half plates respectively, and expanding mechanism mounted on the two base plates; wherein the expanding mechanism comprises two sets of clamping elements arranged on the two base plates respectively;

wherein the coordinated movement of the two half molds and the pre-molding template device comprises the following steps:

moving the two base plates to allow the two template half plates to move towards each other and to move to the middle of the two half molds; and simultaneously, moving the expanding mechanism to allow the two sets of clamping elements to move towards each other; when the clamping elements of the expanding mechanism contact edges of the two sheet parisons with the curved surface, the two sets of clamping elements respectively clamp the edges of the two sheet parisons to stretch the two sheet parisons, which are with the curved surface, in opposite directions.

2. The method according to claim 1, further comprising: supervising molding of the sheet parisons using a pressure, temperature sensor and/or video probe head mounted on the template half plates.

3. The method according to claim 1, wherein the component is connected with the at least one of the two pre-molding parisons by means of welding or riveting.

4. The method according to claim 2, wherein the component is connected with the at least one of two pre-molding parisons by means of welding or riveting.

* * * * *